Nov. 18, 1941.     M. VANDERKLOOT     2,262,784
SCALE DIAL
Filed Jan. 8, 1940     2 Sheets-Sheet 1

ATTEST -

Marinus Vanderkloot
INVENTOR
BY Herbert E. Birch
ATTORNEY

Patented Nov. 18, 1941

2,262,784

UNITED STATES PATENT OFFICE 2,262,784

SCALE DIAL

Marinus Vanderkloot, Chicago, Ill., assignor to Industrial Patents Corporation, Chicago, Ill., a corporation of Delaware Application January 8, 1940, Serial No. 312,961

6 Claims. (Cl. 116—129)

This invention relates to improvements in indicator dials for use with mechanical weighing means.

This application is a continuation in part of my application Serial No. 242,819, filed November 28, 1938, entitled Scale dial.

One of the objects of this invention is to provide a scale dial for use on scales employed in operations wherein one material is added to a second material in a definite proportion to the second material.

Another object of this invention is to provide a scale dial for use on scales employed in the pumping of pickling brine into hams and other meat which is to be cured.

Other objects of this invention will be apparent from the description and claims which follow.

In the process of curing hams and the like, a pickling brine is pumped into the hams in an amount equivalent to from five to fifteen per cent of the weight of the green hams. The conventional practice consists of placing the green ham upon a scale and noting its weight. Brine is then pumped into the ham in an amount which has been determined by reference to a chart.

For example, if the weight of the green ham is ten pounds and brine equivalent to ten per cent of the weight of the green ham is to be pumped into the ham, the chart indicates that one pound of brine should be pumped into the ham. After the operator has referred to the chart, he then pumps the brine into the ham until the indicator needle on the scale registers with the eleven pound indicium. Since hams vary in weight, the charts become cumbersome and the process requires considerable time and mental effort with no assurance of accuracy.

This procedure is exceedingly difficult to follow when part of the pickling brine is pumped into the cushion side of the ham and part of it is pumped into the flank side of the ham as disclosed in the patent to L. S. Paddock, No. 2,084,864.

This invention contemplates the production and use of a scale dial having the usual series of standard weight indicia and one or more series of supplementary or secondary indicia, the secondary indicia being in advanced position with respect to the standard indicia in an amount depending upon the percentage or proportion of material to be added to the original material.

In the drawings like characters of reference are used to designate similar elements.

Figure 1:
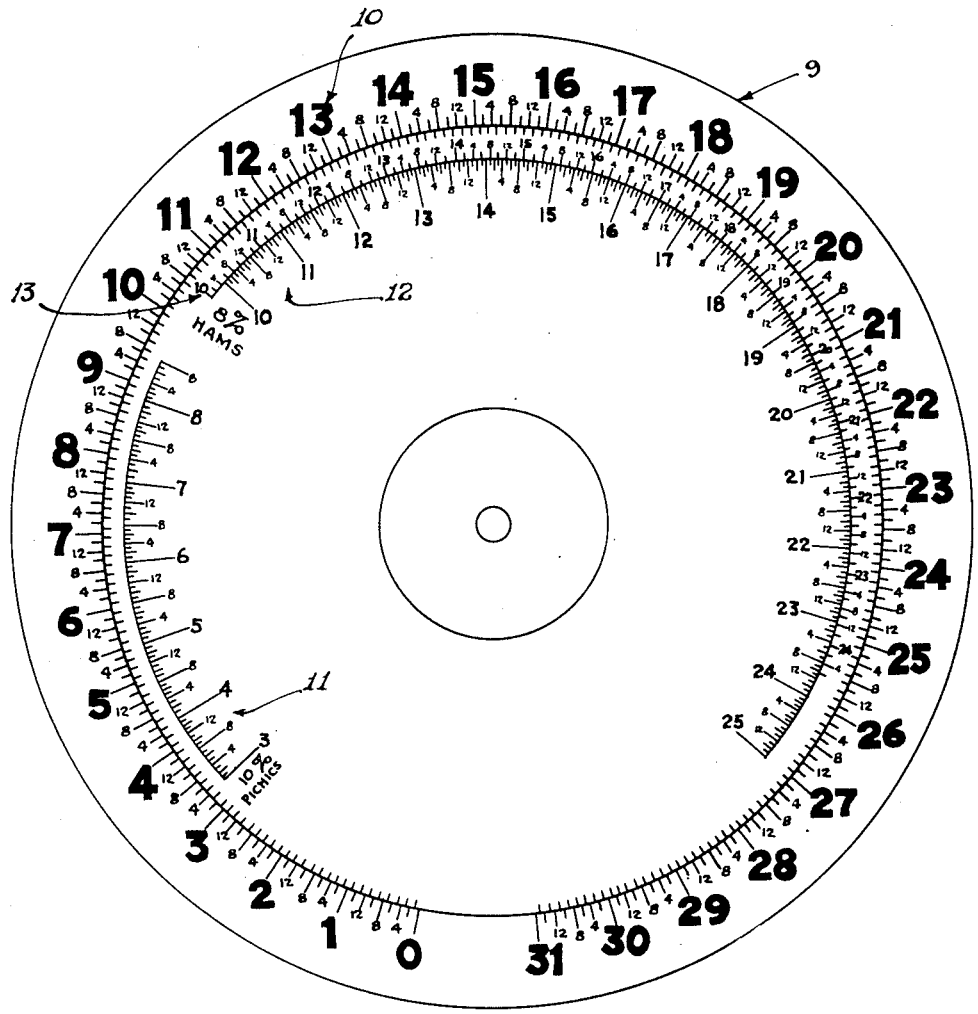
Figure 1 is an enlarged detail view of a scale dial employed with the present invention.
Figure 2:
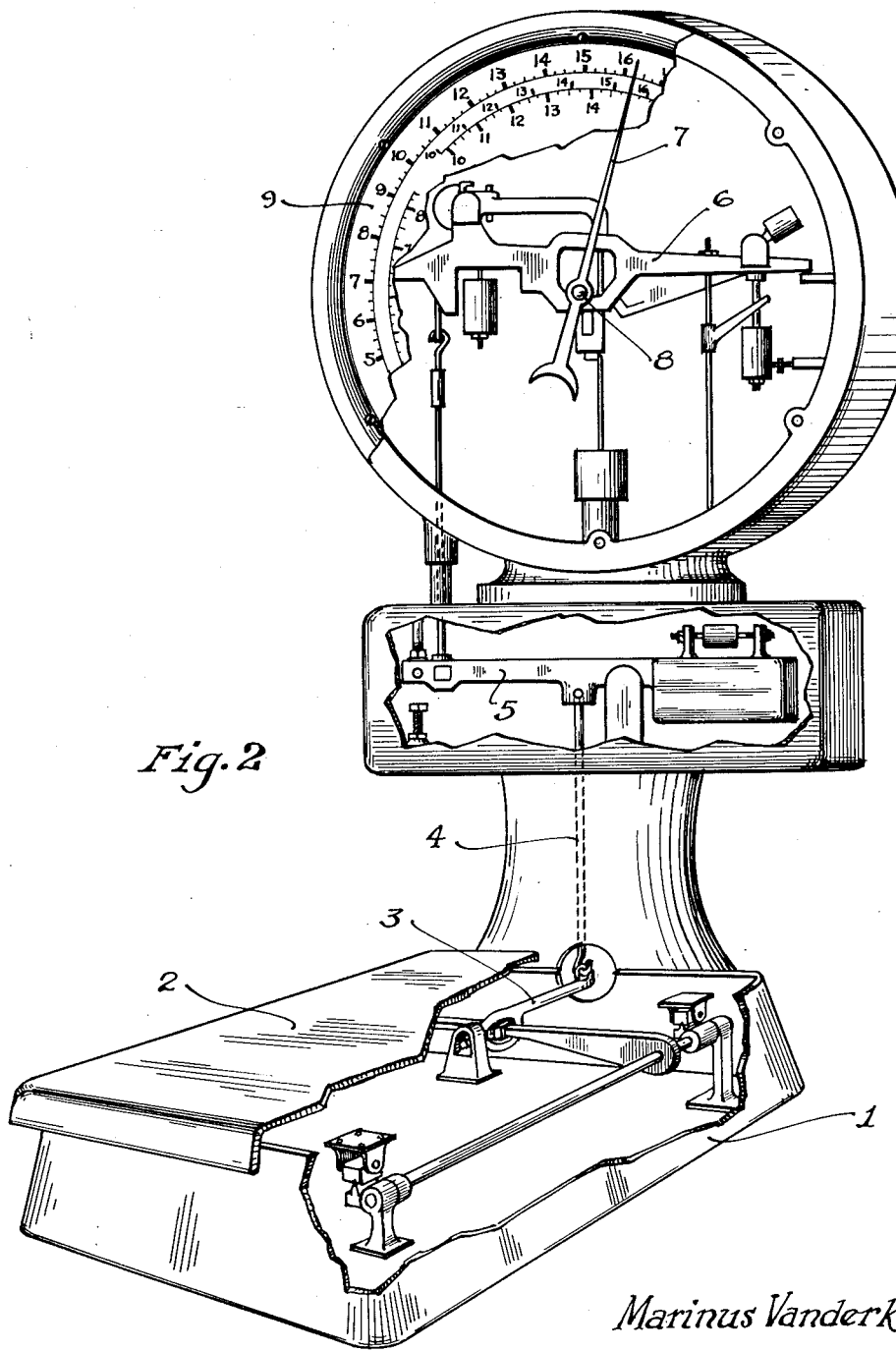
Figure 2 is a perspective view, partly broken away, showing the conventional weighing means with which the scale dial shown in Figure 1 may be employed.

The scale shown in Figure 2 comprises base 1 mounting weighing pan 2, which through linkage mechanism 3, 4, 5 and 6 rotates weight indicator 7 pivotally mounted as at 8 relative to weight dial 9, the weight dial 9 being more specifically shown in Figure 1. The scale mechanism just described is conventional and is well known in the art. It is deemed, therefore, unnecessary to discuss it in further detail.

The dial 9 is provided with the usual or standard weight indicia 10 and a plurality of series of supplementary or secondary weight indicia. The secondary weight indicia are formed on arcs which are concentric with the arcs of the standard weight indicia. It will be understood that this scale dial is intended for use on scales in which the needle or pointer extends radially from the center of the scale dial. For illustrative purposes, the dial shown in Figure 1 includes a series of secondary weight indicia 11 which are positioned ten per cent in advance of the standard weight indicia.

In the use of the scale dial provided with a series of secondary indicia advanced ten per cent with respect to the standard indicia, a green ham is first placed upon the scale and its weight noted on standard series of indicia 10. Assuming the weight of the green ham to be five pounds, the amount of pickling brine to be added would then amount to five-tenths pound or eight ounces. The operator notes the weight of the green ham and then pumps brine into the ham until the scale pointer registers with the five pound indicium on the ten per cent series of indicia 11. It will be noted that at this position of the scale pointer the original or standard indicia 10 indicate the total weight of the ham plus the pickling brine which has been pumped into the ham, namely, five pounds, eight ounces, while the secondary indicia 11 indicate the original weight of the green ham.

The use of this type of scale dial eliminates the mental effort and confusion which is present in the use of a standard scale dial and the usual chart. The operator merely notes the weight of the green ham on the standard indicia and then pumps pickling brine into the ham until the pointer registers with a secondary indicium which corresponds to the initial reading on the standard weight indicium. Each of the indicia on scale 11 is ten per cent in advance of the corresponding standard indicium.

The series of indicia 12 is eight per cent in advance of the standard indicia 10. The series of indicia 13 are sixty per cent of eight per cent or 4.8 per cent in advance of the standard indicia 10. These two series of secondary indicia are particularly adapted for use in the process of curing hams disclosed in Patent No. 2,084,864, in which sixty per cent of the brine is pumped into the cushion side of the ham and about forty per cent is pumped into the flank side of the ham.

Assuming that the weight of the green ham is fifteen pounds, sixty per cent of the eight per cent of pickling brine is to be pumped into the cushion side of the ham. Four and eight-tenths per cent of fifteen pounds is 11.52 ounces, and the fifteen pound indicium on series 13 is, therefore, 11.52 ounces in advance of the fifteen pound indicium on the standard series 10. The operator pumps brine into the cushion side of the ham until the pointer registers with the fifteen pound indicium on series 13. The operator then transfers the pumping needle so that the brine may be pumped into the flank side of the ham. Eight per cent of fifteen pounds is 19.2 ounces or one pound 3.2 ounces. The fifteen pound indicium on series 12 is, therefore, one pound 3.2 ounces in advance of the fifteen pound indicium on the standard series 10. The operator then pumps the pickle into the flank side of the ham until the pointer registers with the fifteen pound indicium on series 12.

By the use of the three series of indicia 10, 13, and 12, the operator merely notes the weight of the green ham and pumps brine into the cushion side until the scale pointer registers with the indicium on series 13, which corresponds to the weight of the green ham. The operator then pumps pickle into the flank side of the ham until the pointer registers with the indicium on series 12, which corresponds to the weight of the green ham. At the end of the pumping operation, the operator, by merely noting the position of the pointer, may record both the original weight of the green ham and the final weight of the ham after all the pickle brine has been pumped into the ham.

It is apparent that the use of the scale dial of this invention eliminates all necessity of employing charts, thereby saving time, mental effort, and insuring a greater accuracy of the operation. This scale dial also eliminates all possibility of confusion and error which attend the use of the conventional charts.

It is obvious that additional series of secondary indicia may be provided to meet varying conditions. If desired, each of the secondary series may be printed in a different color to further avoid any possibility of confusion. Although I have illustrated and described a flat circular scale dial, it is obvious that the segment type or drum type chart may be employed, using the same principle.

I claim:

1. In combination with a weighing means having weight movable means for supporting the material to be weighed, a movable indicator and connecting means synchronizing the movements of the supporting means and the indicator, a dial over which the indicator moves providing a series of standard weight indicia and at least one series of supplementary indicia, the supplementary indicia having numerals advanced so as to indicate a definite proportion by weight with respect to the standard indicia, the supplementary indicia being expressed in terms identical with the standard indicia.

2. In combination with a weighing means having weight movable means for supporting the material to be weighed, a movable indicator and connecting means synchronizing the movements of the supporting means and the indicator, a dial over which the indicator moves providing a series of standard weight indicia and a plurality of series of supplementary indicia, the supplementary indicia having numerals advanced so as to indicate a definite proportion by weight with respect to the standard indicia, each of the series of supplementary indicia being expressed in terms identical with the standard indicia.

3. In combination with a weighing means having weight movable means for supporting the material to be weighed, a movable indicator and connecting means synchronizing the movements of the supporting means and the indicator, a dial over which the indicator moves providing a series of standard weight indicia and at least one series of supplementary indicia, the supplementary indicia having numerals advanced so as to indicate a definite proportion by weight with respect to the standard indicia and being concentric with respect to the standard indicia, the supplementary indicia being expressed in terms identical with the standard indicia.

4. In combination with a weighing means having weight movable means for supporting the material to be weighed, a movable indicator and connecting means synchronizing the movements of the supporting means and the indicator, a dial over which the indicator moves providing a series of standard weight indicia, and a pair of associated series of supplementary indicia, one of the series of supplementary indicia having numerals advanced so as to indicate a definite proportion by weight with respect to the standard indicia, the other of said series of supplementary indicia having numerals advanced so as to indicate a greater proportion by weight with respect to the standard indicia, each of the series of supplementary indicia being expressed in terms identical with the standard indicia.

5. In combination with a weighing means having weight movable means for supporting the material to be weighed, a movable indicator and connecting means synchronizing the movements of the supporting means and the indicator, a dial over which the indicator moves providing a series of standard weight indicia adjacent the outer margin of the dial, a series of supplementary indicia concentric with respect to the series of standard indicia, the supplementary indicia having numerals advanced so as to indicate a definite proportion by weight with respect to the standard indicia, and a second series of supplementary indicia concentric with respect to the standard indicia and the first series of supplementary indicia, and having numerals advanced so as to indicate a greater proportion by weight to said standard indicia, the second series of supplementary indicia being substantially within the same range as the first series of supplementary indicia, and each of the series of indicia being expressed in terms identical with the standard indicia.

6. In combination in a weighing means, a weight movable means for supporting the material to be weighed, an indicator and a dial one of which elements is movable relative to the other, and connecting means synchronizing the movements of the supporting means and said movable element, said dial providing a series of standard weight indicia and at least one series of supplementary indicia, the supplementary indicia have numerals advanced so as to indicate a definite proportion by weight with respect to the standard indicia, the supplementary indicia being expressed in terms identical with the standard indicia.

MARINUS VANDERKLOOT.